United States Patent
Wu et al.

(10) Patent No.: US 10,957,031 B1
(45) Date of Patent: Mar. 23, 2021

(54) INTELLIGENT DEFECT DETECTION FROM IMAGE DATA

(71) Applicant: Accenture Global Solutions Limited, Dublin (IE)

(72) Inventors: Tim Wu, Cerritos, CA (US); Sean Michael O'Connor, Kenmore, WA (US); Takuya Kudo, Kirkland, WA (US)

(73) Assignee: Accenture Global Solutions Limited, Dublin (IE)

(*) Notice: Subject to any disclaimer, the term of this patent is extended or adjusted under 35 U.S.C. 154(b) by 95 days.

(21) Appl. No.: 16/562,642

(22) Filed: Sep. 6, 2019

(51) Int. Cl.
*G06T 7/00* (2017.01)
*G06N 20/00* (2019.01)
*G06T 3/00* (2006.01)
*G06T 7/174* (2017.01)
*G06N 3/08* (2006.01)

(52) U.S. Cl.
CPC .............. *G06T 7/0004* (2013.01); *G06N 3/08* (2013.01); *G06N 20/00* (2019.01); *G06T 3/0006* (2013.01); *G06T 7/174* (2017.01); *G06T 2207/30148* (2013.01)

(58) Field of Classification Search
CPC ..... G06T 7/0004; G06T 7/174; G06T 3/0006; G06T 2207/30148; G06N 20/00; G06N 3/08
See application file for complete search history.

(56) References Cited

U.S. PATENT DOCUMENTS

| | | | |
|---|---|---|---|
| 10,902,598 B2* | 1/2021 | Golden | G06T 7/143 |
| 2017/0337682 A1* | 11/2017 | Liao | G06T 7/30 |
| 2019/0257767 A1* | 8/2019 | Shaubi | G06T 7/174 |
| 2019/0271940 A1* | 9/2019 | Eom | G06F 3/017 |
| 2019/0333219 A1* | 10/2019 | Xu | G06N 3/088 |
| 2020/0226420 A1* | 7/2020 | Shaubi | G06N 3/08 |
| 2020/0272899 A1* | 8/2020 | Dunne | G06N 3/08 |
| 2020/0356718 A1* | 11/2020 | Chu | G06F 30/398 |
| 2021/0001526 A1* | 1/2021 | Hirano | B29C 45/768 |
| 2021/0027445 A1* | 1/2021 | Plihal | G06N 20/00 |

OTHER PUBLICATIONS

Study on Machine Learning Based Intelligent Defect Detection System Chung-Chi Huang, Xin-Pu Lin MATEC Web Conf. 201 01010 (2018) (Year: 2018).*

* cited by examiner

*Primary Examiner* — Utpal D Shah
(74) *Attorney, Agent, or Firm* — Fish & Richardson P.C.

(57) ABSTRACT

Implementations include receiving image data representative of images of items within a physical environment and depicting defects in at least one item, providing one or more of a set of augmented images using image augmentation based on the image data and a set of synthetic images using ML-based image synthesis based on the image data, processing one of the set of augmented images and the set of synthetic images using an ML model to provide a set of defect characteristics representative of defects in the at least one item, providing one or more root causes of each of the one or more defects by processing the set of defect characteristics and ancillary data, the ancillary data representative of the physical environment, and generating one or more alerts based on the one or more root causes for remediation of at least one root cause of the one or more defects.

33 Claims, 4 Drawing Sheets

INTELLIGENT DEFECT DETECTION FROM IMAGE DATA

BACKGROUND

Physical structures can require inspection for defects that can render the physical structure unfit for its intended purpose. In some instances, failure of a physical structure due to a defect can result in losses (e.g., financial losses, physical losses). Consequently, inspection systems have been developed in an effort to enhance efficiencies in defect detection. In some examples, traditional inspection systems process images of physical structures in an effort to detect occurrences of defects.

Some traditional systems implement rule-based object detection to detect defects. However, rule-based detection struggles to adapt to misalignment and tiny shifts in defect images. Some traditional systems use machine learning (ML) models to detect defects in images. However, such ML models need to be trained and training can require training data including labeled defect images. Labeling of defect images typically requires human experts to view and label each image, which is expensive and labor-intensive. Also, the defect images are often imbalanced, meaning available defect image data is not uniformly distributed between the different image classes (usually a strong minority class). This imbalance can negatively affect the accuracy of the resulting ML model (e.g., convolutional neural network (CNN) classifier).

Further, in order to remediate defects, causes of defects also need to be determined. In some scenarios, a cause of a defect may need to be determined rapidly (e.g., in real-time, or near real-time) to avoid further occurrences of the defect and/or imminent failure. In some scenarios, a difference between a target structure (also referred to as golden structure) and the actual structure should be determined rapidly (e.g., in real-time, or near real-time) to detect so-called killer defects. Further, to address causes of defects, defect types, counts, locations, and severity are to be determined and appropriate personnel notified to address the issues identified. Traditional defect detection systems are deficient in addressing one or more of these issues.

SUMMARY

Implementations of the present disclosure are generally directed to an intelligent defect detection (IDD) platform for detecting defects in physical structures based on image data. More particularly, implementations of the present disclosure are directed to an IDD platform that uses one or more of classic image augmentation and machine learning (ML)-based image augmentation to detect and classify defects, determine characteristics of the defects, diagnose causes of the defects, and to alert and deploy personnel to remediate the causes.

In some implementations, actions include receiving image data representative of images of one or more items within a physical environment, one or more images depicting defects in at least one item, providing one or more of a set of augmented images using image augmentation based on the image data and a set of synthetic images using ML-based image synthesis based on the image data, processing one of the set of augmented images and the set of synthetic images using one or more ML models to provide a set of defect characteristics, the set of defect characteristics representative of one or more defects in the at least one item, providing one or more root causes of each of the one or more defects by processing the set of defect characteristics and ancillary data, the ancillary data representative of the physical environment, and generating one or more alerts based on the one or more root causes for remediation of at least one root cause of the one or more defects. Other implementations of this aspect include corresponding systems, apparatus, and computer programs, configured to perform the actions of the methods, encoded on computer storage devices.

These and other implementations can each optionally include one or more of the following features: providing a set of synthetic images using ML-based image synthesis based on the image data includes processing the image data using a generative adversarial network (GAN) that generates a synthetic image by injecting noise into the one or more images; image augmentation includes applying one or more of rotation, shifting, shearing, mirroring, flipping, translations, stretching, cropping, affine transformations, and scaling to the one or more images; the set of defect characteristics includes one or more of a defect count and a defect location; each of the defect count and the defect location are provided using a regional proposals network (RPN); the set of defect characteristics includes one or more of a killer defect and a difference; the killer defect is identified based on applying reinforcement learning (RL) zoom and RL-enhanced refinement to at least one image; the difference is identified using reinforcement learning (RL) zoom and RL-enhanced refinement to at least one image, and by applying image alignment between the at least one image and a golden image; the set of defect characteristics includes a defect type; the defect type is determined based on a defect signature provided through semantic segmentation applied to at least one image; and the items include semiconductor wafers.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to an intelligent defect detection (IDD) platform for detecting defects in physical structures based on image data. More particularly, implementations of the present disclosure are directed to an IDD platform that uses one or more of classic image augmentation and machine learning (ML)-based image augmentation to detect and classify defects, determine characteristics of the defects, diagnose causes of the defects, and to alert and deploy personnel to remediate the causes. In some implementations, actions include receiving image data representative of images of one or more items within a physical environment, one or more images depicting defects in at least one item, providing one or more of a set of augmented images using image augmentation based on the image data and a set of synthetic images using ML-based image synthesis based on the image data, processing one of the set of augmented images and the set of synthetic images using one or more ML models to provide a set of defect characteristics, the set of defect characteristics representative of one or more defects in the at least one item, providing one or more root causes of each of the one or more defects by processing the set of defect characteristics and ancillary data, the ancillary data representative of the physical environment, and generating one or more alerts based on the one or more root causes for remediation of at least one root cause of the one or more defects.

To provide further context for implementations of the present disclosure, and as introduced above, physical structures can require inspection for defects that can render the physical structure unfit for its intended purpose. In some instances, failure of a physical structure due to a defect can result in losses (e.g., financial losses, physical losses). Consequently, inspection systems have been developed in an effort to enhance efficiencies in defect detection. In some examples, traditional inspection systems process images of physical structures in an effort to detect occurrences of defects.

Some traditional systems implement rule-based object detection to detect defects. However, rule-based defect detection is unable to adapt to misalignment and tiny shifts in defect images. Some traditional system use ML models to detect defects in images. However, such ML models need to be trained and training can require training data including labeled defect images. Labeling of defect images typically requires human experts to view and label each image, which is expensive and labor-intensive. Also, the defect images are often imbalanced, meaning available defect image data are not uniformly distributed between the different image classes (usually a strong minority class). This imbalance can negatively affect the accuracy of the resulting ML model (e.g., convolutional neural network (CNN) classifier).

Further, in order to remediate defects, causes of defects also need to be determined. In some scenarios, a cause of a defect may need to be determined rapidly (e.g., in real-time, or near real-time) to avoid further occurrences of the defect and/or failure. In some scenarios, a difference between a target structure (also referred to as golden structure) and the actual structure to detect so-called killer defects should be determined rapidly (e.g., in real-time, or near real-time) to reduce quality risks and/or failure. Further, to address causes of defects, defect types, counts, locations, and severity are to be determined and appropriate personnel to address the issues identified. Traditional defect detection systems are deficient in addressing one or more of these issues.

In view of the above context, implementations of the present disclosure are directed to an IDD platform that uses one or more of classic image augmentation and machine learning ML-based image augmentation to detect and classify defects, determine characteristics of the defects, diagnose causes of the defects, and to alert and deploy personnel to remediate the causes. As described in further detail herein, the IDD platform of the present disclosure includes a generative adversarial network (GAN) image synthetic pipeline to generate the labeled defect images for imbalance defect classes. The IDD platform also provides comprehensive defect detection from image data using a computer vision (CV) deep CNN model and a reinforcement learning (RL) model. The IDD platform enables flexible selection of common CV tasks for image classification, object localization, and semantic segmentation. Further, the IDD platform provides for RL-enhanced region proposals using a RL-mask region-CNN (RCNN) that provides optimized performance for object detection to spot-the-difference, determine defect counts and defect locations, and to identify killer defects. In some examples, the RL-enhanced approach of the present disclosure enables achievement of multiple orders of magnitude over traditional systems in terms of speed, efficiency, and accuracy. As also described in further detail herein, the IDD platform applies failure mode and effect analysis (FMEA) with supervised and unsupervised ML models to correlate defects information to causes (e.g., process, tool).

In accordance with implementations of the present disclosure, the IDD platform automates an end-to-end process for smart manufacturing defect detection and enhances performance (e.g., in terms of accuracy and technical resources expended) over traditional systems. The IDD platform utilizes one or more servers (graphics processing unit (GPU) servers), and big data and deep learning tool sets. The IDD platform performs hyperparameter auto-tuning for the selected neutral network (e.g., learning rate, batch size), and provides options for transfer learning on various deep learning models to reduce model training time. The IDD platform also provides easy-to-use control panels and application programming interfaces (APIs) to manage cloud instances.

Implementations of the present disclosure are described in further detail herein with reference to an example use case. The example use case includes defect detection in semiconductor wafers within a semiconductor fabrication plant (semiconductor fab). In the example context, and among other issues, manufacturers seek to enhance defect pattern classification and killer defect detection to reduce quality risks and quickly identify and remediate causes of the defects. Example defects can include, without limitation, scratches, cracking, and pattern defects. Example causes can include, without limitation, a defective photoresist spray nozzle, a defective chemical-mechanical planarization (CMP) pad, a defective furnace thermal coupler, and presence of foreign particles. It is contemplated, however, that implementations of the present disclosure can be realized in any appropriate use case. For example, and without limitation, implementations of the present disclosure can be realized in pipeline inspection (e.g., oil pipelines, water pipelines). In some examples, implementations of the present disclosure can be used to detect defects along a pipeline and prioritize areas of pipelines for direct assessment.

Figure 1:
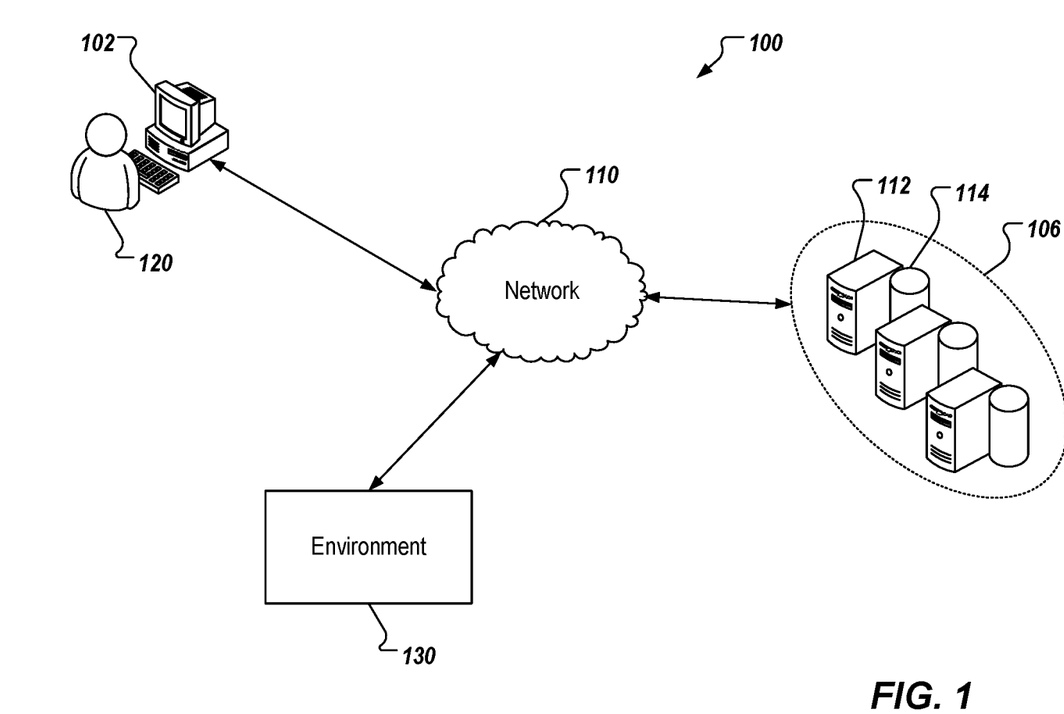
FIG. 1 depicts an example system that can execute implementations of the present disclosure.

FIG. 1 depicts an example system 100 that can execute implementations of the present disclosure. The example system 100 includes a computing device 102, a back-end system 106, and a network 110. In some examples, the network 110 includes a local area network (LAN), wide area network (WAN), the Internet, or a combination thereof, and connects web sites, devices (e.g., the computing device 102), and back-end systems (e.g., the back-end (multi GPU server) system 106). In some examples, the network 110 can be accessed over a wired and/or a wireless communications link. For example, mobile computing devices, such as smartphones can utilize a cellular network to access the network 110.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 106 includes at least one server system 112, and data store 114 (e.g., database). In some examples, at least one server system 112 hosts one or more computer-implemented services that users can interact with using computing devices. For example, the server system 112 of the back-end (multi GPU server) system 106 can host an IDD platform in accordance with implementations of the present disclosure.

Figure 2:
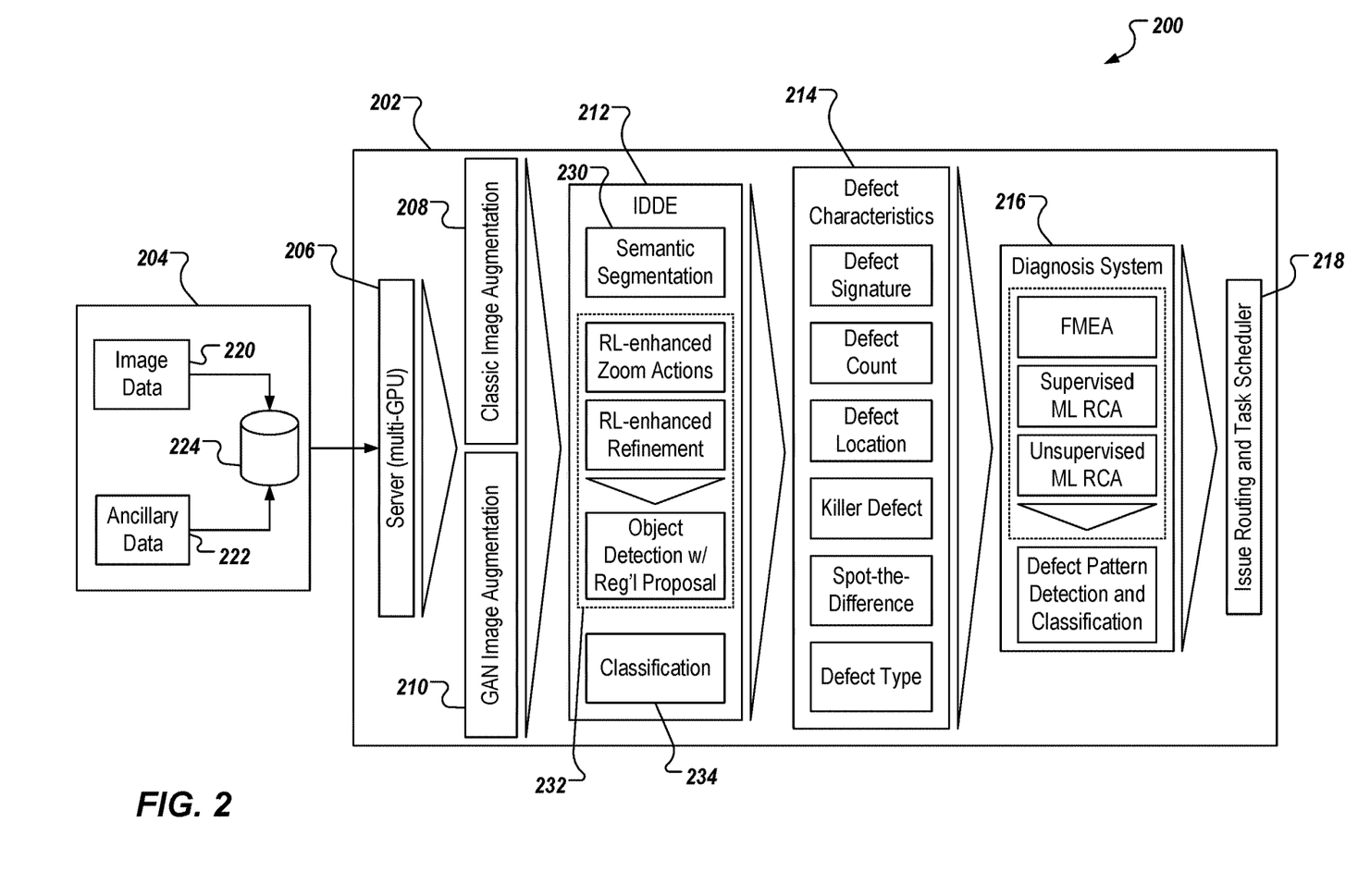
FIG. 2 depicts an example conceptual architecture in accordance with implementations of the present disclosure.

FIG. 2 depicts an example conceptual architecture 200 in accordance with implementations of the present disclosure. In the example of FIG. 2, the example conceptual architecture 200 includes an IDD platform 202 and a source system 204. In some examples, the source system 204 provides image data to the IDD platform 202, which processes the image data to provide real-time, or near-real-time defect detection, cause determination, and initiating remedial action, as described in further detail herein. In the depicted example, the IDD platform 202 includes one or more servers 206, classic image augmentation 208, ML-based image augmentation 210, an IDD engine (IDDE) 212, a defect characteristics determination 214, a diagnosis system 216, and an issue routing and task scheduler 218.

In the depicted example, the source system 204 includes image data 220, ancillary data 222, and a datastore 224. In some examples, the source system 204 represents an environment, in which the image data 220 is generated. For example, and in accordance with the example context, the source system 204 can include a semiconductor fab, in which semi-conductor wafer are manufactured. In this context, the image data 220 can include images of semiconductor wafers that have been manufactured. For example, the image data 220 can be generated using one or more cameras that capture images of the semiconductor wafers. In some examples, the ancillary data 222 includes information relevant to the source system 204. In the example context, information relevant to the source system 204 can include, without limitation, tool information (e.g., information on fabrication machinery), product information (e.g., specifications of the semiconductor wafers that are manufactured), and expert knowledge (e.g., typical defects and respective causes thereof).

In accordance with implementations of the present disclosure, and as described in further detail herein (e.g., with reference to FIG. 3) the IDD platform 202 enables detection of defects, defect signatures, killer defects, defect counts, and defect locations, and provides insights, such as root cause analysis (RCA) for remediation. The IDD platform 202 is provided as an automated deep learning platform that automates synthesis process (augmentation) of the image data 220 and CV tasks, and provides driverless effort to identify defects and determine root causes. In some implementations, data stored in the datastore 224 (e.g., the image data 220, the ancillary data 222) is ingested into the IDD platform 202 through the one or more servers 206. In some examples, at least one server 206 includes multiple-GPUs.

As described herein, real-world conditions can contain more variation than a sample set. In the context of the present disclosure, the actual condition of semiconductors manufactured in a semiconductor fab can contain more variation (e.g., in defects) than is represented in sample image data, which is used to train a ML model. Consequently, a resulting ML model would not generalize well (i.e., is deficient in accounting for variation). Further, the size of training data (e.g., images) for rare or sensitive data (e.g., manufacturing defects) may be insufficient for training highly complex ML models (e.g., deep NNs). For supervised training, labeling a large amount of image data with groundtruth information (e.g., semantic labels, bounding boxes) is time- and resource-consuming and expensive. Accordingly, training data can include variation deficiency, volume deficiency, and/or labelling deficiency).

In view of this, and as depicted in FIG. 2, the IDD platform of the present disclosure provides the classic image augmentation 208 and the ML-based image augmentation 210. In some examples, the classic image augmentation 208 provides one or more augmented images by applying one or more augmentation techniques. Example techniques can include, without limitation, rotation, shifting, shearing, mirroring, flipping, translations, stretching, cropping, affine transformations, and scaling, one or more of which can be random. In general, each augmented image can be described as an altered version of an image.

In some examples, the ML-based image augmentation 210 synthesizes imbalanced, rare and expensive label images using one or more GANs. In some implementations, a complex GAN is used, such as a BourGAN, which generates augmented images that are visually more implausible in comparison to other types of networks. In some examples, a GAN can be described as a deep neural network architecture that includes multiple networks (e.g., a discriminative network (discriminator), a generative network (generator)) that work against one another (adversarial) to produce some output. In general, the generator provides a synthetic image by injecting noise into an image, and the discriminator attempts to distinguish images as either actual or synthetic. As the networks are simultaneously trained (in an unsupervised manner), the generator improves in producing synthetic images that are more and more realistic, and the discriminator improves in identifying synthetic image. In the context of the instant disclosure, the output of the ML-based image augmentation includes synthesized images, such as synthesized defect images. In short, the ML-based image augmentation 210 enables time- and resource-efficient generation of labeled images (e.g., for minority-classes) to provide balance in a resulting CNN classifier, for example. That is, imbalance would otherwise result from imbalanced defect images (i.e., defect images that are not uniformly distributed between different image classes (usually a strong minority-class)).

In some implementations, a set of images, a set of augmented images, and/or a set of synthetic images are provided to the IDDE 212. For example, and as discussed herein, each of the set of augmented images and the set of synthetic images can be generated based on the set of images (e.g., by classic image augmentation and ML-based image augmentation, respectively). In accordance with implementations of the present disclosure, the IDDE 212 automatically applies multiple CV tasks using deep learning models. Example tasks include, without limitation, semantic segmentation 230, object detection 232, and classification 234. The IDDE 212 further provides RL-enhancements for the object detection 232. Example RL-enhancements include RL-enhanced zoom actions (e.g., zoom in/out of images) and RL-enhanced refinement (e.g., image refinement).

In some examples, semantic segmentation 230 includes classifying each pixel (or a group of pixels) in an image from a predefined set of classes, each class representing an object (e.g., a wafer, a semiconductor). In effect, semantic segmentation 230 results in a mask over each object within an image. The semantic segmentation 230 uses a ML-model (e.g., CNN) to perform the semantic segmentation. In accordance with implementations of the present disclosure, the semantic segmentation 230 enables all possible defects to be obtained and defined in terms of defect contours to diagnosis defect patterns based on defect signatures, as described herein.

In some examples, the object detection 232 includes detecting the presence of one or more objects within an image, an object being indicated by a bounding box provided within the image. The object detection 232 uses a ML-model (e.g., CNN) to generate regions of interest (ROI) marked with bounding boxes, extract visual features for each of bounding box, and determine whether an object is present based on the visual features. In accordance with implementations of the present disclosure, the object detection 232 provides RL-enhanced object/anomaly detection by applying RL on top of a region proposals network (e.g., R-CNN, fast R-CNN, mask R-CNN). In this manner, the object detection 232 automates image alignment (registration) and concatenating of a reference image (golden image) and target image (actual image) to perform spot-the-difference as the defect/anomaly. Further, search trajectories are enhanced based on rewards (localize improvement) (e.g., rather than a brute-force sliding window approach). In some examples, the classification 234 includes classifying objects (e.g., distinguishing objects) within an image (e.g., classifying objects as semiconductors within an image). The classification 234 uses a ML-model (e.g., CNN) to perform the object classification.

In some implementations, the defect characteristics determination 214 applies multiple ML-models to provide values for each of a set of defect characteristics. Example characteristics include, without limitation, defect signature, defect count, defect location, killer defects, spot-the-difference, and defect type. In some implementations, the defect characteristics are processed by the diagnosis system 216, which performs FMEA for RCA. In some examples, the issue routing and task scheduler 218 automatically schedules tasks based on results (e.g., defect pattern detection and classification) to direct the alert messages to the appropriate response team, provide instruction for manual prevention, and/or schedule repair services.

In accordance with implementations of the present disclosure, IDD platform uses one or more CNNs (e.g., VGG, ResidualNet, Inception) to determine killer defect types and to derive relationships between the source system (e.g., a tool in the semiconductor fab) through the defect types.

Figure 3:
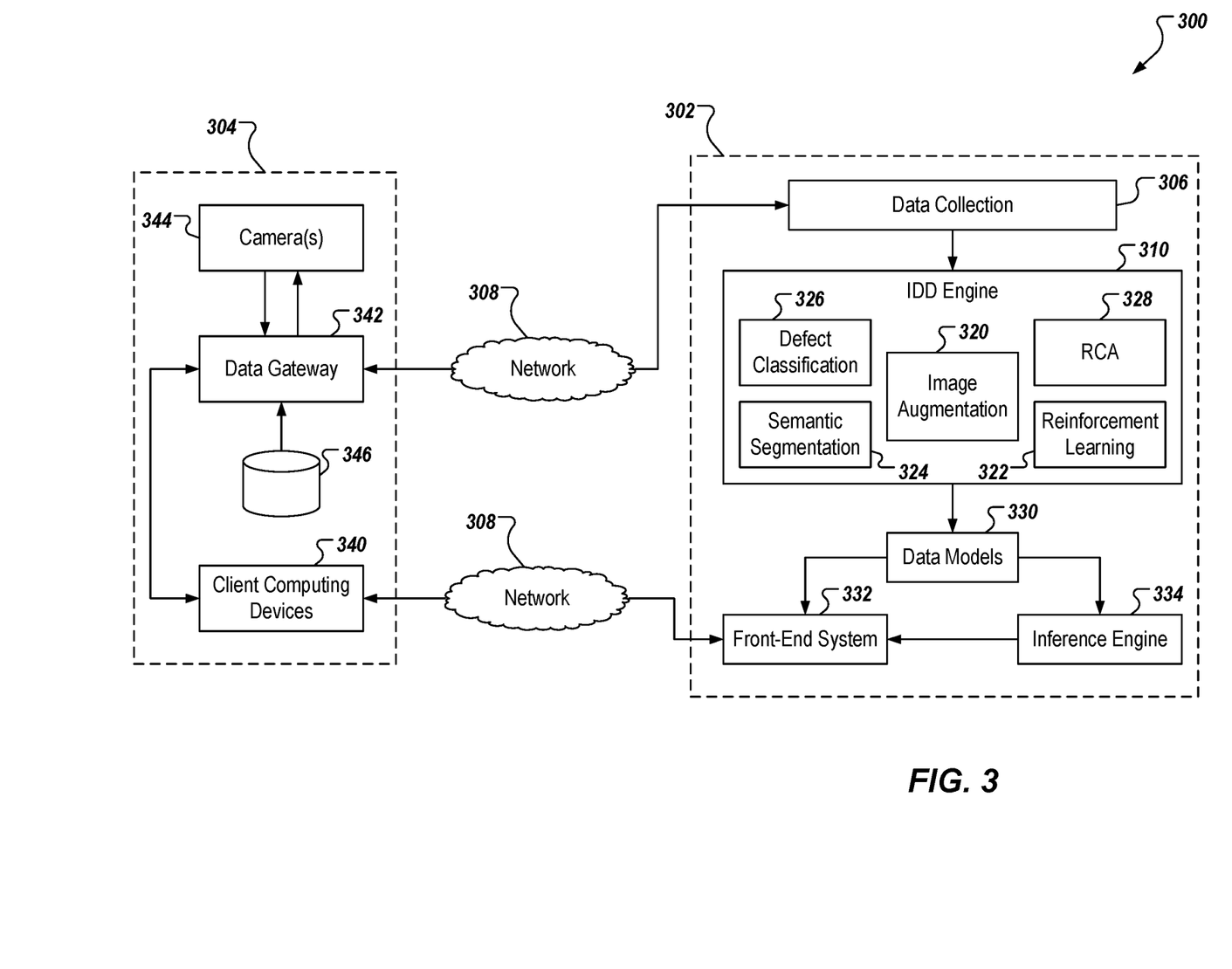
FIG. 3 depicts an example system architecture in accordance with implementations of the present disclosure.

FIG. 3 depicts an example system 300 in accordance with implementations of the present disclosure. The example system 300 supports an IDD platform for detecting defects, determining causes of defects, and alerting and deploying personnel to remediate issues, as described in detail herein. As depicted in FIG. 3, the example system 300 includes a computing system 302 and an on-premise system 304.

In some examples, the computing system 302 is programmed to receive data (e.g., image data) from various data sources (e.g., one or more cameras). The computing system 302 can include one or more computing devices (e.g., servers, personal computing devices). For example, the computing system 302 can be a cloud computing system that uses a networked collection of computing devices that enable computational units, which may be virtual computing devices that are operating across the collection of computing devices, to be deployed and scaled as needed. Other configurations are also possible, such as an on-premise computing system with GPU-acceleration to handle deep learning in a time- and resource-efficient manner.

The computing system 302 includes a data collection subsystem 306 that is programmed to obtain and collect data from data sources that are external to the computing system 302, as described herein. For example, the data collection subsystem 306 can receive data from devices that transmit data over one or more networks 308 (e.g., the Internet and/or other networks). The data collection subsystem 306 can accept data as batch data and/or stream data to receive data in real-time (or near real-time), such as real-time image data.

The computing system 302 includes an IDDE 310 that is programmed to receive data obtained by the data collection subsystem 306. For example, the IDDE 310 includes an image augmentation module 320, a RL module 322, a semantic segmentation module 324, a defect classification module 326, and a RCA module 328 each of which can be provided as one or more computer-executable programs executed by one or more computing devices.

In some examples, the IDD platform provides one or more wizards to guide the user to choose an image augmentation technique (e.g., classic, ML-based). In some implementations, the IDDE 310 (e.g., the image augmentation module 320) examines input images to evaluate one or more characteristics and to make a recommendation as to augmentation technique based on the one or more characteristics. An example characteristic includes, without limitation, tensor dimension (e.g., one-dimensional tensor, two-dimensional tensor, and three-dimensional tensor, as provided by TensorFlow). For example, if the tensor-dimension is more than three (3) (e.g., RGB), use of ML-based image augmentation is recommended. In response to selection of the image augmentation technique, the image augmentation module 320 uses the classic or the ML-based (e.g., GAN-based) image augmentation techniques to synthesis expensive label defect images in order to reduce overfitting, improve the classification accuracy (e.g., as described above with reference to FIG. 2). In some examples, both classic image augmentation and ML-based image augmentation can be performed. For example, each is performed and respective set of images are provided (e.g., a set of augmented images (classic), and a set of synthetic images (ML-based)). In some examples, a set of images is selected for further processing (e.g., CV tasks described herein).

To reduce the manual efforts, the IDD platform can include a web-based interface, within which image data can be input (e.g., dragged and dropped). In response to input of the image data, the IDD platform automatically processes the image data, as described herein, to learn the natural features of the image data, generate augmented and/or synthesized image data, and use the generated images can be used in downstream CV tasks.

In some implementations, the IDD platform provides questions (e.g., through the wizard) regarding downstream CV tasks that are to be performed. For example, the IDD platform can inquire as to whether defect object detection is to be performed, whether defect classification is to be performed, and/or whether semantic segmentation is to be performed. In some implementations, the IDD platform provides recommendations on ML models that can be used. For example, a recommendation can be provided based on the images that are to be processed. In some examples, an imbalance in classes is determined from the image data and one or more ML models are recommended based on the imbalance. In some examples, for each recommended ML model, computing resources required to train and execute the ML model, and the expected accuracy and time to train the ML model can be provided.

In further detail, and in the example context of semiconductor fabrication, example image classes can include, without limitation, particle defect, fiber defect, scratch, water mark, pellicle broken, pellicle scratch, contaminants, and fingerprint. Accordingly, an image class corresponds to a type of defect depicted in images of the image class. Further, each type of defect results in a respective level of damage to the overall process. For example, and in the example context, the pellicle broken type of defect is rare and difficult to detect. In the event of a pellicle broken defect, a photo mask of the semiconductor fab equipment must be repaired or replaces, which can carry significant cost. On the other hand, other types of defects (e.g., water mark, particle defect) can be caused by the environment and the causes thereof can be more easily and cost-effectively addressed.

In some implementations, the RL module 322 performs the defect object detection, which is also referred to as RL-enhanced object detection herein. In some examples, RL-enhanced object detection is performed using a network with multiple sequential layers. A first layer includes RL-based image alignment, in which images of like regions from different images are overlaid for analysis. The RL-based approach is more accurate and efficient in aligning images where noise and slight differences are present. A second layer is provided as a R-CNN (or faster R-CNN, mask R-CNN)-based defect detector that processes the aligned images to provide difference representations, that can be used for time- and resource-efficient detection and classification of image differences.

In further detail, the RL module 322 executes RL techniques for image alignment, which outperform other techniques, particularly in instances where differences are subtle (e.g., in semiconductor fabrication where defects are very subtle). As compared to other image registration techniques, the RL-based approach of the present disclosure does not require manual input of control points. Instead, the RL-based approach automatically identifies the best control points to align the reference and target structure on the image data. Given reference structure control points, the RL-based approach enables a top-down search strategy to narrow down the location for the target structure and align with the reference structure. For example, the RL module 322 includes an RL agent that uses the deep Q-Learning method to find the localization policy with the reward using Intersection-over-Union (IoU) between the target structure area and the predicted bounding box for each state. In comparison to computationally intensive sliding window approaches, the RL-based approach of the present disclosure increases accuracy for anomaly detection (spot-the-difference in structure) and significantly speeds up computation performance.

In some examples, the semantic segmentation module 324 performs semantic segmentation to provide a defect contour (also referred to as defect blob) for each defect within an image. Each defect contour is representative of a defect pattern (or defect signature) that can be identified by the IDD platform.

In some examples, the defect classification module 326 automate image classification using a set of deep CNN models (e.g., VGG, ResidualNet, Inception). The defect classification module 326 can identify the presence of killer defects, if any, and can assist in deriving relationship between the source system (e.g., a tool in the semiconductor fab) through the defect types.

In some examples, the RCA module 328 performs classification, correlation and/or RL-based action tracking approaches for cause inference, as described herein. More particularly, and based on the information (e.g., defect type) provided by other modules, the RCA module 328 infers the underlying causes for process/tool/parts abnormalities that would result in the identified defects. In further detail, relationships between defect type and failure pattern/signature are defined, and a ML-framework is provided that enables variable importance scores to be attributed to input features in addition to FMEA. In some examples, influence maps are provided, which identify top influencers of defect information (defect counts, defect location, defect signature, detect types, killer defect pattern). This ML-framework and influence maps are used by the RCA module to identify root cause factors, understand each root cause and its impact, and aggregate risk of delay and delay time. This information is used by the RCA module 328 to identify one or more corrective actions. For example, the RCA module 328 can maintain a table of corrective actions that can be indexed by one or more root cause factors and/or defect types. In this manner, the one or more corrective actions can be determined based on a query that includes one or more of a root cause factor and a defect type.

In accordance with implementations of the present disclosure, the IDDE 310 provides one or more data models 330 that can be used by a front-end system 332 and/or an inference engine 334. In some implementations, the inference engine 334 can receive data from the data collection subsystem 306 and/or from the frontend system 332. In some examples, the data is data, to which the one or more data models 330 are being applied. In some examples, users can submit queries through the front-end system 332, which queries are analyzed by the inference engine 334. In some examples, the inference engine 334 may run a background process that continuously evaluates data that is received through the data collection subsystem 306 and can provide an alert to one or more appropriate entities (e.g., devices, user accounts) regarding the problem and inferred solution (e.g., when an issue is identified that needs to be addressed).

In some examples, the inference engine 334 can process specific queries that are received through the front-end system 332 on a demand basis (e.g., as queries are received from users). For example, the front-end system 332 can include a query engine that is programmed to receive queries, process queries (e.g., textual analysis of queries, interaction with the inference engine 334), and to provide results. For example, a client computing device 340 of the on-premise system 304 can be used by users to submit the queries over one or more networks 308 (e.g., the internet, LANs, WANs, wireless networks, VPNs, combinations thereof).

For example, the IDD platform of the present disclosure provides ML-based auto-alerting and repair scheduling module. In some examples, based on the result of the RCA, the IDD platform notifies one or more stakeholders about a defect, the cause of the defect, and a severity level of the defect. In some examples, the severity level can indicate an urgency at which the cause of the defect should be addressed (e.g., to minimize losses from repeated defects resulting from the cause). Example severities can include, without limitation, high (e.g., repair immediately), medium (e.g., repair within 24 hours), and low (e.g., repair within 1 week). In some examples, the IDD platform notifies and schedules repair of the defect with appropriate personnel. For example, the IDD platform can issue an alert to maintenance personnel indicating the location of the cause (e.g., which machine within the semiconductor fab), the cause, the type of defect resulting from the cause, and the severity. In some examples, ML models are used to classify the correct solution for corrective actions, to classify the severity level, and to match the correct solution to the correct tool owner/technician with the severity level. In some examples, a task scheduler and alerting message distribution API sends out the correct information to the target task owner (e.g., maintenance personnel).

With regard to the on-premise system 304, the client computing devices 340 can be any of a variety of appropriate computing devices, such as laptops, desktop computers, mobile computing devices (e.g., smartphones, tablet computing devices, wearable computing devices), embedded computing devices (e.g., diagnostic devices), and/or other appropriate computing devices. The client computing devices 340 can receive data, similar to the data that is provided to the data collection subsystem 306, through a data gateway 342 through which the data can be routed to appropriate ones of the client computing devices 340 and/or to the data collection subsystem 306. The data can be generated by various data sources, such as one or more cameras 344. The data gateway 342 can also allow for information stored in a database 346, such as image data that may be stored and distributed in batches, to be communicated to the data collection subsystem 306 and/or the client computing devices 340. The database 346 can also include external data (e.g., ancillary data described herein). The data gateway 342 can communicate with the data collection subsystem 306 over the network 308.

Figure 4:
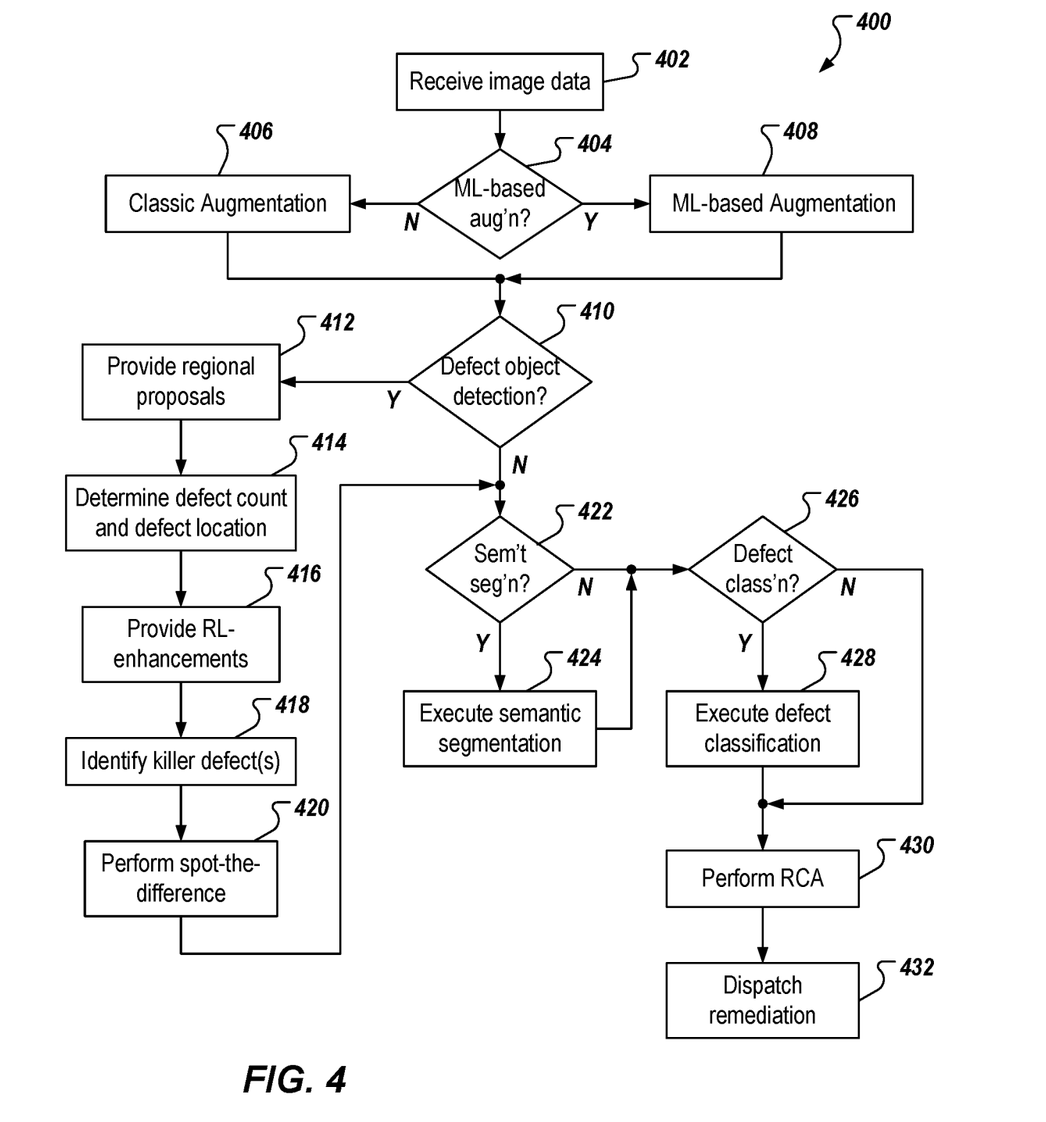
FIG. 4 depicts an example process that can be executed in implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 106 of FIG. 1).

Image data is received (402). It is determined whether ML-based image augmentation is to be used (404). If ML-based image augmentation is not to be used, classic image augmentation is performed (406). If ML-based image augmentation is to be used, ML-based image augmentation is performed (408). In some implementations, both classic image augmentation and ML-based image augmentation are performed. It is determined whether defect object detection is to be performed (410). If defect object detection is to be performed, regional proposals are provided (412). Defect count and defect location are determined (414). RL-enhancements are provided (416). One or more killer defects, if any, are identified (418). Spot-the-difference is performed (420) and the example process 400 loops back. If defect object detection is to be performed or has already been performed, it is determined whether semantic segmentation is to be performed (422). If semantic segmentation is to be performed, semantic segmentation is executed (424). If semantic segmentation is not to be performed or semantic segmentation has been executed, it is determined whether defect classification is to be performed (426). If defect classification is to be performed, defect classification is executed (428). If defect classification is not to be performed or defect classification has been executed, RCA is performed (430). One or more remediations are dispatched (432).

Implementations of the present disclosure provide one or more technical advantages. For example, the IDD platform introduces a combined image augmentation and image synthetization approach to enable classic augmentation and/or GAN model to synthesize images for imbalance and rare labeled defect images. For image synthesis, this auto-ML approach for GAN model zoo is able to learn natural features of a dataset (set of images), automatically run a GAN model zoo, and select an optimized GAN model to generate realistic, high-quality samples (set of synthetic images) for downstream tasks. Further, execution of multi-GAN models is fully automated and a web-based interface is provided. Users can drag-and-drop image data, and the IDD platform automatically learns the natural features of the input image data, generate new image data similar to the observed ones without coding. The IDD platform automatically produces a dashboard to select the optimal GAN model for defect detection and classification.

As another example, the IDD platform of the present disclosure provides various models to choose from depending on the user's tasks (e.g., localization, segmentation, classification). The IDD platform provides automated hyper-parameter tuning and flexible transfer learning selections (e.g., weights, number of layers). Further, the stacking of deep RL layers and regional proposal networks (RPNs) enhance object defect detection and image anomaly detection. This hierarchical object detection presents a neutral network architecture that enables: stepwise deformation of a bounding box in its size, position, and aspect ratio to tightly fit the detected object, and automate image alignment (registration), concatenation of the golden image and target image, then spot-the-difference to identify the defect/anomaly locations between golden image and target images using RPN models.

As another example, the IDD platform applies FMEA as input in combination with ML models to generate influence maps that identify to likely influencers (causes) of current defect information. Further, RCA is used to determine next best action given defect pattern and characteristics, and one or more ML models classify and provide rankings of anomaly tools/parts/processes that caused the defect. A feedback mechanism to the tool module expert to adjust the false positive and false negative results. That is, the auto alerting and repair scheduling of the IDD platform is used to route alerts to the response team to determine next best action (e.g., message, email alert, manual prevention, calling repair service) given defect root causes.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple (CPU and/or GPU) processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for identifying defects and causes thereof in physical environments using a machine learning (ML)-based intelligent defect detection (IDD) platform, the method being executed by one or more processors and comprising:
   receiving image data representative of images of one or more items within a physical environment, one or more images depicting defects in at least one item;
   providing one or more of a set of augmented images using image augmentation based on the image data and a set of synthetic images using ML-based image synthesis based on the image data;
   processing one of the set of augmented images and the set of synthetic images using one or more ML models to provide a set of defect characteristics, the set of defect characteristics representative of one or more defects in the at least one item;
   providing one or more root causes of each of the one or more defects by processing the set of defect characteristics and ancillary data, the ancillary data representative of the physical environment; and
   generating one or more alerts based on the one or more root causes for remediation of at least one root cause of the one or more defects.

2. The method of claim 1, wherein providing a set of synthetic images using ML-based image synthesis based on the image data comprises processing the image data using a generative adversarial network (GAN) that generates a synthetic image by injecting noise into the one or more images.

3. The method of claim 1, wherein image augmentation comprises applying one or more of rotation, shifting, shearing, mirroring, flipping, translations, stretching, cropping, affine transformations, and scaling to the one or more images.

4. The method of claim 1, wherein the set of defect characteristics comprises one or more of a defect count and a defect location.

5. The method of claim 4, wherein each of the defect count and the defect location are provided using a regional proposals network (RPN).

6. The method of claim 1, wherein the set of defect characteristics comprises one or more of a killer defect and a difference.

7. The method of claim 6, wherein the killer defect is identified based on applying reinforcement learning (RL) zoom and RL-enhanced refinement to at least one image.

8. The method of claim 6, wherein the difference is identified using reinforcement learning (RL) zoom and RL-enhanced refinement to at least one image, and by applying image alignment between the at least one image and a golden image.

9. The method of claim 1, wherein the set of defect characteristics comprises a defect type.

10. The method of claim 9, wherein the defect type is determined based on a defect signature provided through semantic segmentation applied to at least one image.

11. The method of claim 1, wherein the items comprise semiconductor wafers.

12. A non-transitory computer-readable storage medium coupled to one or more processors and having instructions stored thereon which, when executed by the one or more processors, cause the one or more processors to perform operations for identifying defects and causes thereof in physical environments using a machine learning (ML)-based intelligent defect detection (IDD) platform, the operations comprising:
   receiving image data representative of images of one or more items within a physical environment, one or more images depicting defects in at least one item;
   providing one or more of a set of augmented images using image augmentation based on the image data and a set of synthetic images using ML-based image synthesis based on the image data;
   processing one of the set of augmented images and the set of synthetic images using one or more ML models to provide a set of defect characteristics, the set of defect characteristics representative of one or more defects in the at least one item;
   providing one or more root causes of each of the one or more defects by processing the set of defect characteristics and ancillary data, the ancillary data representative of the physical environment; and
   generating one or more alerts based on the one or more root causes for remediation of at least one root cause of the one or more defects.

13. The computer-readable storage medium of claim 12, wherein providing a set of synthetic images using ML-based image synthesis based on the image data comprises processing the image data using a generative adversarial network (GAN) that generates a synthetic image by injecting noise into the one or more images.

14. The computer-readable storage medium of claim 12, wherein image augmentation comprises applying one or more of rotation, shifting, shearing, mirroring, flipping, translations, stretching, cropping, affine transformations, and scaling to the one or more images.

15. The computer-readable storage medium of claim 12, wherein the set of defect characteristics comprises one or more of a defect count and a defect location.

16. The computer-readable storage medium of claim 15, wherein each of the defect count and the defect location are provided using a regional proposals network (RPN).

17. The computer-readable storage medium of claim 12, wherein the set of defect characteristics comprises one or more of a killer defect and a difference.

18. The computer-readable storage medium of claim 17, wherein the killer defect is identified based on applying reinforcement learning (RL) zoom and RL-enhanced refinement to at least one image.

19. The computer-readable storage medium of claim 17, wherein the difference is identified using reinforcement learning (RL) zoom and RL-enhanced refinement to at least one image, and by applying image alignment between the at least one image and a golden image.

20. The computer-readable storage medium of claim 12, wherein the set of defect characteristics comprises a defect type.

21. The computer-readable storage medium of claim 20, wherein the defect type is determined based on a defect signature provided through semantic segmentation applied to at least one image.

22. The computer-readable storage medium of claim 12, wherein the items comprise semiconductor wafers.

23. A system, comprising:
   one or more processors; and
   a computer-readable storage device coupled to the one or more processors and having instructions stored thereon which, when executed by the one or more processors, cause the one or more processors to perform operations for identifying defects and causes thereof in physical environments using a machine learning (ML)-based intelligent defect detection (IDD) platform, the operations comprising:
receiving image data representative of images of one or more items within a physical environment, one or more images depicting defects in at least one item;
providing one or more of a set of augmented images using image augmentation based on the image data and a set of synthetic images using ML-based image synthesis based on the image data;
processing one of the set of augmented images and the set of synthetic images using one or more ML models to provide a set of defect characteristics, the set of defect characteristics representative of one or more defects in the at least one item;
providing one or more root causes of each of the one or more defects by processing the set of defect characteristics and ancillary data, the ancillary data representative of the physical environment; and
generating one or more alerts based on the one or more root causes for remediation of at least one root cause of the one or more defects.

24. The system of claim 23, wherein providing a set of synthetic images using ML-based image synthesis based on the image data comprises processing the image data using a generative adversarial network (GAN) that generates a synthetic image by injecting noise into the one or more images.

25. The system of claim 23, wherein image augmentation comprises applying one or more of rotation, shifting, shearing, mirroring, flipping, translations, stretching, cropping, affine transformations, and scaling to the one or more images.

26. The system of claim 23, wherein the set of defect characteristics comprises one or more of a defect count and a defect location.

27. The system of claim 26, wherein each of the defect count and the defect location are provided using a regional proposals network (RPN).

28. The system of claim 23, wherein the set of defect characteristics comprises one or more of a killer defect and a difference.

29. The system of claim 28, wherein the killer defect is identified based on applying reinforcement learning (RL) zoom and RL-enhanced refinement to at least one image.

30. The system of claim 28, wherein the difference is identified using reinforcement learning (RL) zoom and RL-enhanced refinement to at least one image, and by applying image alignment between the at least one image and a golden image.

31. The system of claim 23, wherein the set of defect characteristics comprises a defect type.

32. The system of claim 31, wherein the defect type is determined based on a defect signature provided through semantic segmentation applied to at least one image.

33. The system of claim 23, wherein the items comprise semiconductor wafers.

* * * * *